United States Patent [19]

Weber

[11] Patent Number: 5,482,671

[45] Date of Patent: Jan. 9, 1996

[54] METHOD OF MANUFACTURING INTERLOCKING PARTS

[75] Inventor: Wilfried Weber, Schopfloch-Unteriflingen, Germany

[73] Assignee: fischerwerke, Artur Fischer GmbH & Co. KG, Waldachtal, Germany

[21] Appl. No.: 311,430

[22] Filed: Sep. 23, 1994

[30] Foreign Application Priority Data

Sep. 28, 1993 [DE] Germany ............... 43 32 971.3

[51] Int. Cl.⁶ ..................................... B22F 7/02
[52] U.S. Cl. .................... 419/36; 419/3; 419/5; 419/6; 419/8; 419/41
[58] Field of Search ................ 29/422, 439, 517, 29/444, 447, 455.1, 417; 419/3, 5, 6, 7, 8, 9, 36, 41; 219/216; 428/36; 75/244

[56] References Cited

U.S. PATENT DOCUMENTS

| 3,823,463 | 7/1974 | Weaver et al. | 29/417 |
| 4,025,751 | 5/1977 | Wright | 219/216 |
| 4,511,612 | 4/1985 | Hüther et al. | 428/36 |
| 4,729,789 | 3/1988 | Ide et al. | 75/244 |
| 4,976,915 | 12/1990 | Kunki | 419/8 |
| 5,006,289 | 4/1991 | Yamamoto et al. | 264/61 |
| 5,056,209 | 10/1991 | Ohashi et al. | 29/517 |

FOREIGN PATENT DOCUMENTS

| 3133209 | 3/1983 | Germany . |
| 1149768 | 4/1969 | United Kingdom . |

OTHER PUBLICATIONS

Plastverarbeiter 44, No. 3, 1993, "Spritzgiessen keramischer und metallischer Sinterformteile", pp. 108–112.

*Primary Examiner*—Donald P. Walsh
*Assistant Examiner*—John N. Greaves
*Attorney, Agent, or Firm*—Michael J. Striker

[57] ABSTRACT

A method is provided for manufacturing interlocking parts, in which at least one part is manufactured by powder injection molding. To compensate for the amount of contraction of one of the parts manufactured by powder injection molding and, if desired, to produce an additional clearance, a separation layer of plastic material is applied between the interlocking parts. After the injection process to form the separation layer, the separation layer and the binder are removed by a binder-removing and sintering process step. The method is also applicable to powdered metal extrusion for manufacture of double-layered metal parts.

3 Claims, 2 Drawing Sheets

METHOD OF MANUFACTURING INTERLOCKING PARTS

BACKGROUND OF THE INVENTION

The invention relates to a method for the manufacture of interlocking parts, by both powder injection molding and by extrusion, and, more particularly, to a method of making double-layered metal parts in which at least one part is made by a powder metal extrusion method.

The methods of manufacturing parts by powder injection molding and by extrusion are well known. While the latter method is used only in combination with powdered metal for the extrusion of shaped metal parts, powder injection molding is used to manufacture both metal and ceramic parts. The method steps are largely identical. Thus, for example, the powdered metal is mixed with the desired alloying additives, also in powder form. This powder mixture thus formed is plasticized in a heated kneader with a polymeric organic binder (waxes and plastics) and subsequently granulated by processing in conventional injection molding machines. An injection molding tool similar to a plastics injection molding tool is used as the mold.

The injection-molded shaped bodies (green parts) are placed in a binder-removing furnace to remove and eliminate the binder. During the binder-removing process the molecule chains of the binder disintegrate as a result of thermal or chemical decomposition. At the same time, presintering of the metallic shaped bodies takes place, which imparts an adequate stability to the shaped bodies.

During sintering, which can be performed in vacuo or under a protective gas, the final material properties are imparted to the metallic injection-molded parts. Their density increases considerably and their dimensions shrink by up to 20%. Because of the considerable contraction, it has not previously been possible to manufacture interlocking parts by powder injection molding nor to manufacture double-layer shaped metal parts by a continuous extrusion process.

SUMMARY OF THE INVENTION

It is an object of the present invention to provide a method with which interlocking parts can be manufactured by powder injection molding and double-layered metal parts can be manufactured by a continuous powdered metal extrusion process.

According to the invention the method for manufacturing interlocking parts comprises the steps of:

a) making at least one part by powder injection molding;

b) applying a separation layer made of plastic material onto a first part by injection molding;

c) after the applying of step b), injecting another part onto the separation layer by powder injection molding; and d) after the injecting steps c) and b), performing a binder-removing and sintering process step to eliminate the separation layer to produce the interlocking parts.

The separation layer is formed on the first part with a thickness corresponding at least to an amount of contraction experienced by the other part after the binder-removing and sintering process step.

The separation layer consisting of plastic material is injected by the injection molding method as a plastic material part onto the part normally present in the interior of the double-layered metal part which acts as the core. The external shape of this plastic part subsequently forms the internal shape of the additional part applied by a powder injection-molding method. The thickness of the separation layer, and thus the wall thickness of the plastic part, corresponds at least to the amount of contraction of the additional part applied by powder-injection molding after the binder-removing and sintering process. When the thickness of the separation layer corresponds exactly to the amount of contraction, measured in a linear dimension, the fit of the additional part on the first part after completion of the method is a press fit, and, when the thickness of the separation layer is sufficiently larger than the amount of contraction, there is a clearance between the interlocking parts. The plastic part acting as the separation layer is melted away during the binder-removing process or is eliminated chemically together with the binder contained in the powder mixture.

The method is suitable both for ceramics (Ceramic Injection Molding=CIM) and for metals (Metal Injection Molding=MIM). In both cases, a catalyst which accelerates the depolymerization of the plastic material used as a binder can be used for removing the binder. The method according to the invention thus allows the interlocking and interengaging engagement of two parts, of which at least one part is manufactured by powder injection molding. It is therefore possible, for example, for an expansible metal sleeve to be applied by the powder injection molding method to a steel bolt with a stepped portion, adjoining the end of which there is an expander cone; the expansible metal sleeve is able to move axially on the stepped portion. In this example, the expansible bolt can be manufactured conventionally by a turning or cold-forming method and be introduced as an insert into the injection-molding tool.

It is, however, alternatively possible to manufacture both interlocking parts by the powder injection molding method. In that case, after injection-molding of the first part, the separation layer is injected on and both parts together have binder removed from them and are sintered in one or two stages. It is especially advisable to carry out the processes of removing the binder and sintering in two stages, if the two parts have a different material composition and/or different binders.

To reduce the cycle time during manufacture of the interlocking parts and application of the separation layer, two-component or three-component injection molding machines with corresponding injection-molding tools are advantageously used.

In the manufacture of multi-layered metal parts, in which at least one layer is manufactured by the powdered metal extrusion method, a separation layer of plastic material is likewise applied to the inner part in a continuous extrusion process.

The outer metal coating is then effected by powdered metal extrusion. In this continuous manufacturing process, the thickness of the separation layer also corresponds at least to the contraction of the outer metal layer. After the injection operation, the separation layer is removed by melting or is eliminated chemically during the binder-removing process in a through-type furnace. Using this method, shaped metal parts manufactured by conventional methods can subsequently be coated with an additional metal layer. If the inner shaped metal part is manufactured by the powdered metal extrusion method, both the separation layer and the outer metal layer are co-extruded continuously using additional injection cylinders.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENTS

Figure 1:
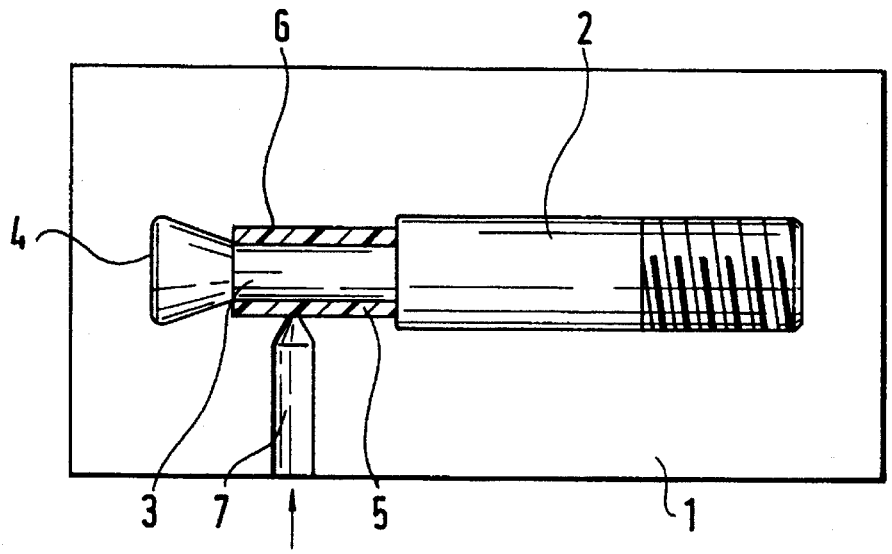
FIG. 1 is a diagrammatic partially cross-sectional, partially side view of a mold used for injection of the separation layer onto a metal bolt as insert.
Figure 2:
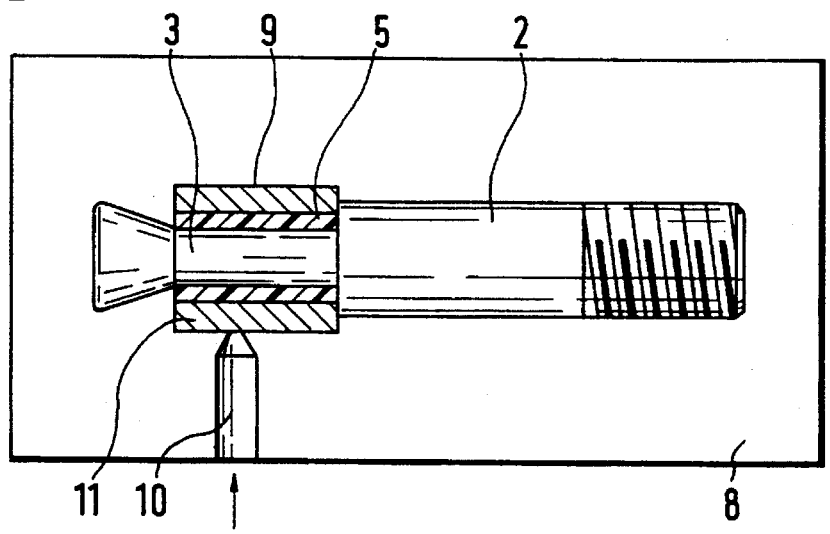
FIG. 2 is a diagrammatic partially cross-sectional, partially side view of a mold for injecting a second metal part onto the separation layer.
Figure 3:
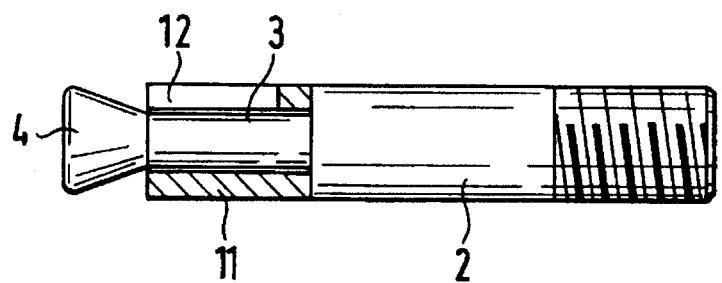
FIG. 3 is a diagrammatic partially cross-sectional, partially side view of a metal bolt with an expansible sleeve after the binder removing and sintering process step.

FIGS. 1, 2 and 3 illustrate schematically in the form of diagrammatic drawings the method steps for the manufacture of two interlocking parts, using an expansion anchor as an example. The metal bolt 2, manufactured conventionally or by a metal injection molding method and inserted in the mold 1, has a reduced diameter portion 3 and an expander cone 4 adjoining it and connected to it. To apply the separation layer 5 consisting of plastic material to the reduced diameter portion 3, the mold has a cavity 6 surrounding the reduced diameter portion. This cavity is filled in the first injection molding step through an injection channel 7. After the bolt 2 provided with the separation layer 5 has been placed in the injection mold 8 (see FIG. 2), the powder mixture blended with the binder is injected into the cavity 9 through an injection channel 10. This creates an interlocking arrangement of the additional part in the form of the expansible sleeve 11 on the reduced diameter portion 3 of the bolt 2. The binder-removal and sintering process step subsequently follows, during which both the binder and the separation layer are eliminated. The free space created by the thickness of the separation layer 5 enables the contraction of the expansible sleeve 11 that occurs during binder removal and sintering to take place. The thickness of the separation layer 5 is of such dimensions in the embodiment illustrated that between the expansible sleeve 11 and the reduced diameter portion 3 of the bolt 1 a clearance is provided allowing axial displacement. The sleeve 11 can be provided with one or more longitudinal slits 12 so that as the expander cone 4 is drawn into the expansible sleeve 11 an expansion is effected.

The bolt 2 can also be manufactured by the powdered metal injection molding method (MIM). In that case, the bolt 2 is manufactured in a preceding injection-molding method in a third mold, as described for the expansible sleeve 11. The additional method steps illustrated in FIG. 1 and FIG. 2 then follow. In that case, the thickness of the separation layer 5 can be kept smaller, since the bolt 2 manufactured by the MIM method also contracts during the binder-removal and sintering process. To achieve inexpensive manufacture, the use of two-component or three-component injection-molding machines with corresponding injection molding tools for multicomponent injection molding is well-suited as the manufacturing method.

Figure 4:
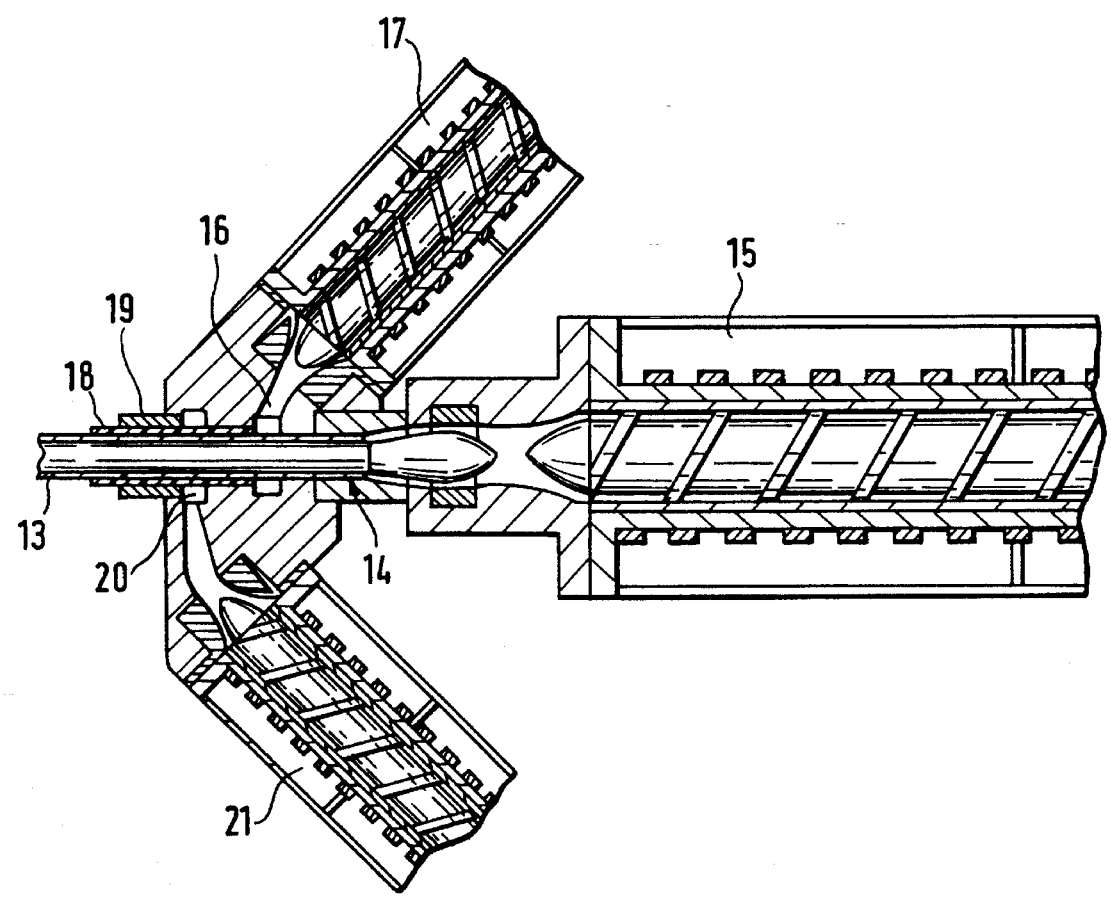
FIG. 4 is a diagrammatic partially cross-sectional, partially side view of the manufacture of a double-layered metal tube by a Co-extrusion method according to the invention.

FIG. 4 illustrates diagrammatically the manufacture of a double-layered metal part on a CO-extrusion machine. The inner tube 13 is manufactured with the injection nozzle 14 by the powdered metal extrusion method. Coating with the powdered metal and binder is effected by the injection cylinder 15. In a further step, the separation layer 18 of plastic material is applied to the inner tube 13 through the nozzle 16 from the injection cylinder 17. The outer metal layer 19 is injected on the separation layer 18 by the powdered metal injection molding method through the nozzle 20 from the injection cylinder 21. The double-layered part manufactured by the CO-extrusion method then passes through a binder-removing and sintering furnace, in which the binder and the separation layer are eliminated. The separation layer enables double-layered parts to be manufactured in a continuous manufacturing operation, in which each layer can have a different material composition and degree of contraction.

While the invention has been illustrated and described as embodied in a method of manufacturing interlocking parts, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A method for manufacturing interlocking parts wherein at least one of said parts is produced by powder injection molding, said method comprising the steps of:

a) powder injection molding a first part (2);

b) applying a separation layer (5) made of plastic material onto the first part (2);

c) after said applying of step b), powder injection molding another (11) of said parts onto the separation layer (5); and d) after said powder injection molding step c), performing a binder-removing and sintering process to remove the separation layer (5) to produce said interlocking parts; wherein the separation layer (5) is formed on said first part (2) with a thickness corresponding at least to an amount of contraction experienced by said other part (11) after said performing step d).

2. A method of manufacturing double-layered metal parts, said method comprising the steps of:

a) applying a separation layer (18) of plastic material by extrusion to an inner metal part (13);

b) applying an outer metal layer (19) to the separation layer (18) by a powdered metal extrusion method; and c) after the extrusion process of step b), removing the separation layer (18) in a continuous binder-removing and sintering process; wherein the separation layer (18) has a thickness corresponding at least to an amount of a contraction of the outer metal layer (19) occurring after the continuous binder-removing and sintering process of step c).

3. A method as defined in claim 2, further comprising manufacturing the inner metal part (13) by a powdered metal extrusion process and continuously co-extruding the separation layer (18) on the inner metal layer (13) and also the outer metal layer (19) on the separation layer (18).

\* \* \* \* \*